(No Model.)
J. CLARK.
VEHICLE WHEEL.
No. 269,919. Patented Jan. 2, 1883.
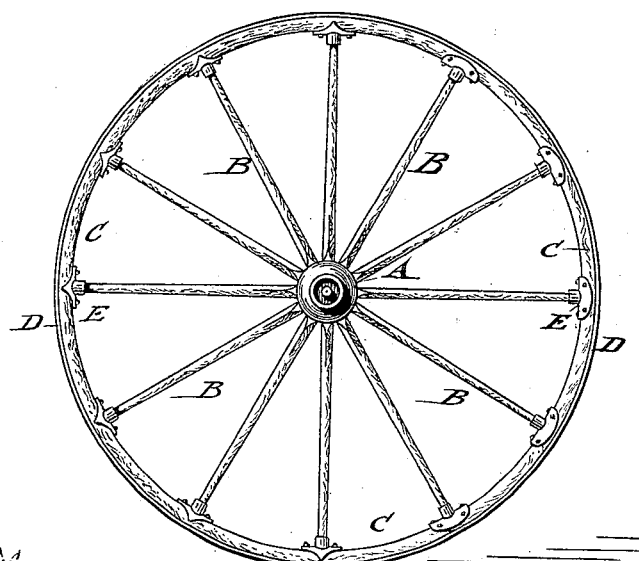
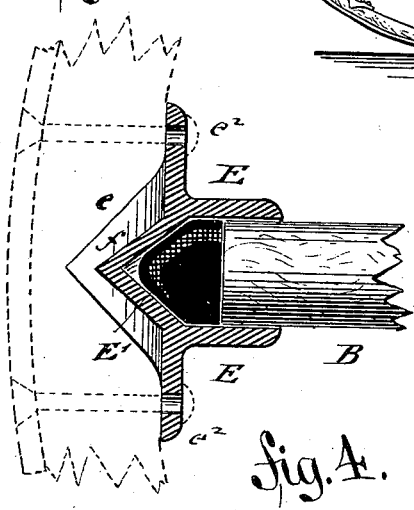
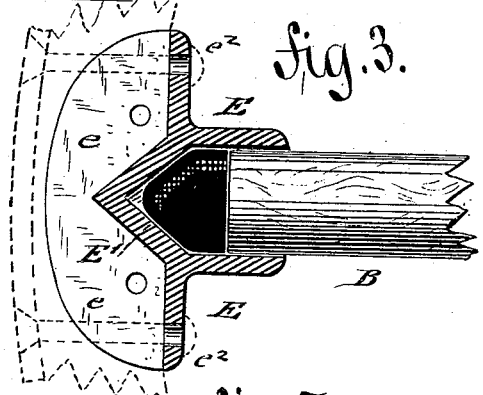
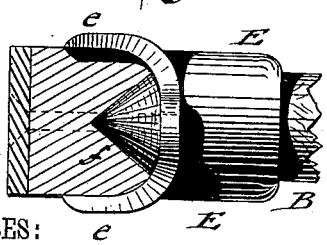
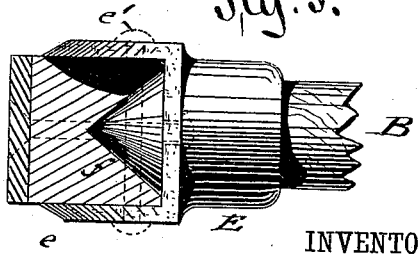
WITNESSES:
INVENTOR
Joseph Clark
BY
ATTORNEY

UNITED STATES PATENT OFFICE.

JOSEPH CLARK, OF BROOKLYN, NEW YORK.

VEHICLE-WHEEL.

SPECIFICATION forming part of Letters Patent No. 269,919, dated January 2, 1883.

Application filed November 3, 1882. (No model.)

*To all whom it may concern:*

Be it known that I, JOSEPH CLARK, of Brooklyn, in the county of Kings and State of New York, have invented certain new and useful Improvements in Vehicle-Wheels, of which the following is a specification.

This invention relates to improvements in vehicle-wheels by which the injurious strains exerted by the tire on the fellies and spokes are entirely obviated, and thereby wheels of greater strength, durability, and elasticity obtained.

The invention consists of connecting the spokes with the fellies by means of sockets which are bolted by side flanges to the fellies and connected to the tire and provided with elastic cushions interposed between the ends of the spokes and the bottoms of the sockets.

In the accompanying drawings, Figure 1 represents a side elevation of my improved vehicle-wheel. Figs. 2 and 3 are detail vertical longitudinal sections, showing the socket-connection of the spokes and fellies; and Figs. 4 and 5 are end views of the socket-connection shown in Figs. 2 and 3, respectively.

Similar letters of reference indicate corresponding parts.

A in the drawings represents the hub, B the spokes, C the fellies, and D the tire, of my improved vehicle-wheel.

The hub A is preferably made of iron, the tenoned ends of the spokes being inserted into the mortises of the hub in the usual manner. The outer ends of the spokes B are connected to the fellies by means of metal sockets E, which sockets are connected by side flanges, $e$, of suitable size, and transverse fastening-bolts $e'$ to the sides of the fellies D, while the longitudinal end plates, $e^2$, are bolted to the fellies and tire, as shown in Figs. 3 and 4. The bottoms $f$ of the sockets are made of conically-tapering shape, and project into corresponding recesses at the inner circumference of the fellies, so that an intimate connection between sockets and fellies is formed. A cushion, E', of rubber or other suitable material, is interposed between the bottom of the socket E and the end of the spoke B, the cushion being preferably made to correspond to the shape of the socket, but of somewhat less length than the same, so as to provide some extra space for the cushion when compressed by the spokes.

When the tire is applied in red-hot state to the fellies it shrinks by cooling on the same, and exerts thereby a certain compression and strain upon the fellies, so as to cause the dishing of the same. The straining of the fellies and the dishing of the same is, however, entirely prevented by means of the cushioned sockets, which have the further advantage that they prevent the spokes from becoming "tire-bound." By thus cushioning the spokes at their connection with the fellies it is also possible to use hubs cast of iron, which was heretofore considered impossible on account of the rigidity of the material.

A further advantage of my improved wheel is that the cushions impart a certain elasticity to the wheel, so as to deaden sound. This makes them specially adapted to light vehicles, such as buggies and the like. As the fellies are not mortised, their strength is not impaired, so that a wheel of greatly-superior strength, durability, and elasticity is obtained.

I am aware that the spokes of a wheel have been connected to the fellies by means of metallic sockets, and I am also aware that the spokes have been cushioned in sockets of the fellies by means of elastic cushions and I therefore do not broadly claim either of these features. In my socket-connection of the spokes with the fellies the metal spoke-sockets are so attached to the fellies as not to weaken the same, there being but a very short recess required for the conical base part or spur of the socket. The elastic cushions are furthermore arranged inside of the metallic sockets, so that the ends of the spokes require no tenoning, and are therefore not weakened in the least.

Having thus described my invention, I claim as new and desire to secure by Letters Patent—

In a vehicle-wheel, the combination of the fellies having metallic sockets, with side and end flanges and conically-tapering bottoms projecting into corresponding recesses of the fellies, with the spokes, and with elastic cushions of conical shape interposed between the bottom of the sockets and the ends of the spokes, substantially as set forth.

In testimony that I claim the foregoing as my invention I have signed my name in presence of two subscribing witnesses.

JOSEPH CLARK.

Witnesses:
PAUL GOEPEL,
SIDNEY MANN.